(No Model.)
C. W. SIEMENS.
MELTING, REFINING, AND WORKING OUT GLASS.
No. 254,572. Patented Mar. 7, 1882.
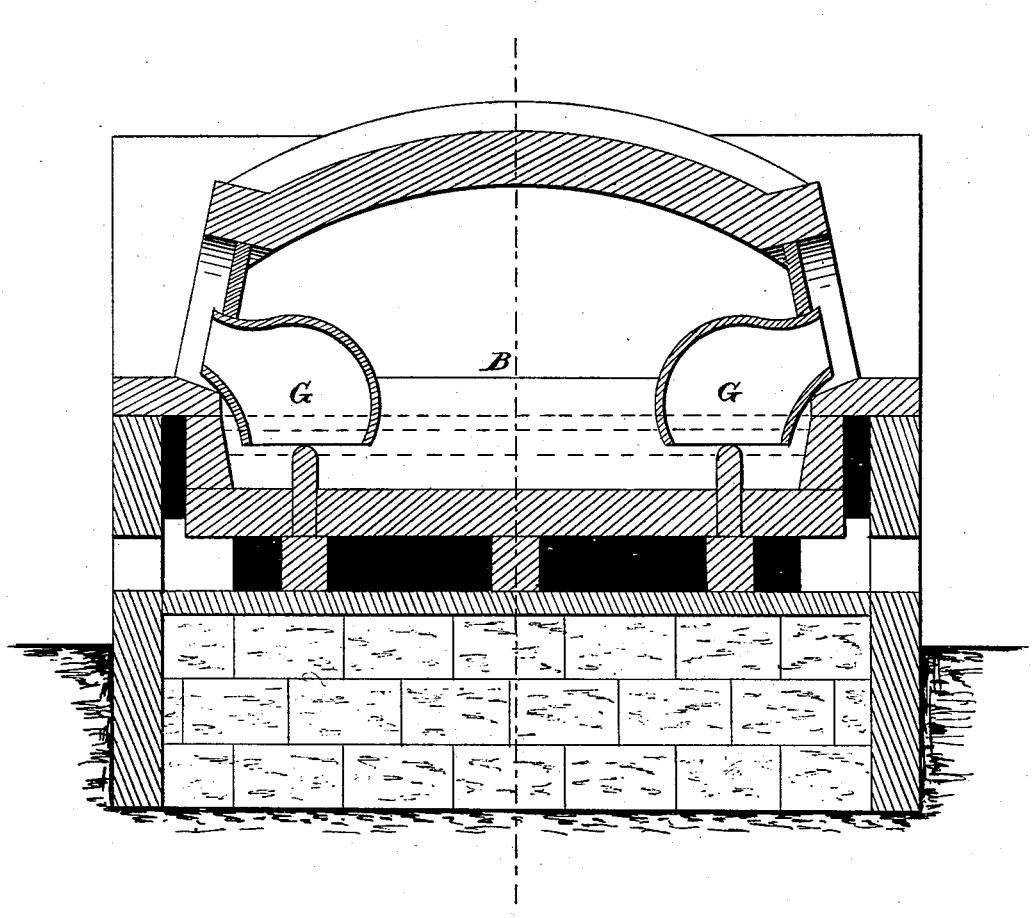
Witnesses
Saml R. Turner
W. W. Johnson
C. W. Siemens Inventor
by
C. S. Whitman
Att'y

UNITED STATES PATENT OFFICE.

CHARLES WILLIAM SIEMENS, OF WESTMINSTER, COUNTY OF MIDDLESEX, ENGLAND.

MELTING, REFINING, AND WORKING OUT GLASS.

SPECIFICATION forming part of Letters Patent No. 254,572, dated March 7, 1882.

Application filed June 18, 1880. (No model.) Patented in England November 21, 1872.

*To all whom it may concern:*

Be it known that I, CHARLES WILLIAM SIEMENS, of Westminster, in the county of Middlesex, England, have invented an Improvement in Melting, Refining, and Working Out Glass, (for which I obtained a patent in Great Britain, bearing date November 21, 1872,) of which the following is a specification.

My invention relates more particularly to that class of furnaces known as "tank-furnaces;" and the nature thereof consists in combining with the tank one or more receivers having an opening or openings in the bottom thereof for the inflow of refined glass, and an opening or openings in the top or upper part thereof, through which the glass is gathered or worked out.

In the accompanying drawings, Figure 1 represents a transverse section of the working-out end of a glass-furnace with receivers combined therewith according to my invention. Fig. 2 is a sectional plan of the same.

The receivers or hoods G G serve to protect the glass therein, also the workmen, from the flame of the furnace, and at the same time, being made to dip down some distance in the liquid, they secure the removal of the glass for working only from the lowest workable depth of the tank, where it is most pure and most thoroughly compounded and fused. They may be of any size or shape which will protect the refined glass from the flame of the furnace, and entirely open at the bases thereof, as shown in the drawings, or provided with bottoms having holes formed therein for the inflow of the molten metal. They may be made to rest upon projections rising from the bottom of the tank, or supported in any other way which may be preferred.

The furnace is constructed with suitable openings, through which the said receivers may be introduced or removed without wasting the molten glass or varying materially the temperature of the furnace. It may also be provided with any suitable number of holes, through which the woking-out ends of the receivers may be allowed to project.

The receivers may be combined with a furnace having a single tank, or with a regenerative gas-furnace having two or more communicating compartments—such, for instance, as are described in the Letters Patent of the United States granted to Charles William Siemens and Frederick Siemens, June 11, 1872, or in the application of Charles William and Frederick Siemens, filed in the United States Patent Office of even date with the application of which this specification forms a part.

The raw materials introduced into the tank through doors formed in the sides or ends thereof, on being acted on by the surface heat there produced, are melted down into glass, which, on fining, gradually sinks down toward the bottom of the tank, and passes up into the receivers, from whence it is gathered to be worked out through their mouths at or near the top of the receivers. The glass so gathered will be free from the impurities floating on the surface of the metal in the tank, and will be protected from the direct flame of the furnace, to which the operator will not, either, be exposed.

Having thus described my invention, I claim and desire to secure by Letters Patent of the United States—

1. The process of continuously melting, fining, and working out glass in a regenerative gas-furnace having a single tank by means of one or more covered receivers, whereby the glass is freed from the impurities floating on the surface of the metal and protected from the action of the flame.

2. The combination, with a continuous glass-melting furnace having a single tank, of one or more covered receivers having an opening or openings at the bottom for the inflow of the glass, and an opening or openings at or near the top, where the glass is worked out, as and for the purposes described.

3. The combination, with a continuous glass-melting regenerative gas-furnace having a single compartment, of one or more receivers having an opening or openings at the bottom for the inflow of the glass, and an opening or openings at or near the top, where the glass is worked out, as and for the purposes described.

C. WILLIAM SIEMENS.

Witnesses:
  CHAS. ROCHE,
  THOS. MARCK,
*Both of Waterloo Place, Pall Mall, London, Notary's Clerks.*